United States Patent [19]

Wood et al.

[11] Patent Number: 5,112,120
[45] Date of Patent: May 12, 1992

[54] NATURAL FLOW WING

[75] Inventors: Richard M. Wood, Virginia Beach; Steven X. S. Bauer, Newport News, both of Va.

[73] Assignee: The United States of America as represented by the Administrator of the National Aeronautics and Space Administration, Washington, D.C.

[21] Appl. No.: 560,923

[22] Filed: Jul. 31, 1990

[51] Int. Cl.⁵ .............................................. B64C 3/14
[52] U.S. Cl. .................................. 244/35 R; 244/36
[58] Field of Search ............... 244/34 R, 35 R, 35 A, 244/45 R, 36

[56] References Cited

U.S. PATENT DOCUMENTS

| | | | |
|---|---|---|---|
| 2,709,052 | 5/1955 | Berg | 244/35 R |
| 3,946,688 | 3/1976 | Gornstein et al. | |
| 4,264,279 | 4/1981 | Dereng | |
| 4,619,423 | 10/1986 | Holmes et al. | |
| 4,655,412 | 4/1987 | Hinklemann | |

FOREIGN PATENT DOCUMENTS

| | | | |
|---|---|---|---|
| 385928 | 11/1923 | Fed. Rep. of Germany | 244/35 R |
| 2733743 | 2/1979 | Fed. Rep. of Germany | 244/35 R |
| 604495 | 5/1926 | France | 244/35 R |
| 634345 | 3/1950 | United Kingdom | 244/35 R |

Primary Examiner—Galen Barefoot
Attorney, Agent, or Firm—George F. Helfrich

[57] ABSTRACT

The invention is a natural flow wing and a method for constructing the same. The method comprises contouring a three-dimensional upper surface and a three-dimensional lower surface of the natural flow wing independently of one another into a prescribed shape. Experimental data and theoretical analysis show that flow and pressure-loading over an upper surface of a wing tend to be conical about an apex of the wing, producing favorable and unfavorable regions of performance based on drag. The method reduces these unfavorable regions by shaping the upper surface such that a maximum thickness near a tip of the natural flow wing moves aft, thereby contouring the wing to coincide more closely with the conical nature of the flow on the upper surface. Nearly constant compressive loading characterizes the flow field over a lower surface of the conventional wing. Magnitude of these compressive pressures on the lower surface depends on angle of attack and on a streamwise curvature of the lower surface of the wing and not on a cross-sectional spanwise curvature. The method thereby shapes the lower surface to create an area as large as possible with negative slopes. Any type of swept wing may be used to obtain the final, shaped geometry of the upper and lower surfaces of the natural flow wing.

17 Claims, 8 Drawing Sheets

NATURAL FLOW WING

ORIGIN OF THE INVENTION

The invention described herein was made by employees of the U.S. Governement and may be manufactured and used by or for the Government for governmental purposes without the payment of any royalties thereon or therefor.

BACKGROUND OF THE INVENTION

1. Field of the Invention

The present invention relates to a wing and, more specifically to a wing contoured to match the natural flow of air about the wing, and to a method of designing such a wing.

2. Description of the Related Art

Future supersonic military and commercial aircraft will be required to have high levels of lifting efficiency at subsonic, transonic, and supersonic speeds. Present philosophies for the design of wings vary greatly in addressing multi-point design conditions. A review of existing philosophies of wing design for subsonic, transonic, and supersonic flight reveals both contradictions and similarities.

The contradictions exist mainly between the philosophies for subsonic and transonic (low-speed) cruise design and the schemes for supersonic cruise design. For low speed designs, the tendency is toward a low wing sweep, thick airfoils, and blunt leading edges, with supercritical airfoils being most commonly used. On the other hand, supersonic designs typically employ high-sweep wings with thin airfoils and sharp leading edges. Methods involving linear theory usually provide wing twist and camber.

At maneuvering conditions, designs for both low-speed and supersonic wings utilize variable-camber devices such as leading-edge and trailing-edge flaps. At subsonic and transonic speeds, leading-edge flaps have succeeded fairly well. At supersonic speeds, however, leading-edge flaps have accomplished only minimal benefits in performance. Variable camber devices also have the added drawbacks of increased complexity in design, increased wing weight, and loss in usable volume.

An alternate approach for meeting the required maneuvering conditions is developing a fixed camber wing. Generally, these wing designs have succeeded at their designed lift conditions but have suffered severe camber drag penalties at lower lift conditions.

A conventional uncambered delta wing is conical about the wing tip. Experimental data in "Supersonic Aerodynamics of Delta Wings", NASA TP-2771, March 1988, and theoretical analysis in "The NCOREL Computer Program for 3-D Nonlinear Supersonic Potential Flow Computations", NASA CR-3694, August 1983, show, however, that the flow and pressure loading over the upper surface of a swept delta wing at subsonic, transonic, and supersonic speeds tend to be conical about the apex of the wing. The conical nature of the field of flow on the upper surface of the wing produces favorable and unfavorable pressure fields based on considerations involving drag.

SUMMARY OF THE INVENTION

An object of the invention is to address problems in wing design over a broad range of Mach numbers and lift conditions.

Another object of the invention is to capitalize on the naturally-occurring flow field and resulting pressure distributions over a wing.

A further object of the invention is to improve the structural and volumetric efficiency of swept wings by eliminating the need for variable-camber devices for flow management.

Yet another object of the invention is to provide a wing with fixed geometry that reduces pressure drag from zero-lift through high-lift conditions.

The present invention attains the foregoing and additional objects by contouring a three-dimensional upper surface and a three-dimensional lower surface of a wing independently of one another into a presecribed shape. As discussed earlier, experimental data and theoretical analysis show that flow and pressure loading over the upper surface of a swept delta wing at subsonic, transonic, and supersonic speeds tend to be conical about the apex of the wing. This conical nature of the flow field on the upper surface of the wing produces favorable and unfavorable regions of performance based on drag. The present invention reduces these unfavorable regions of performance by shaping the upper surface such that a maximum thickness at a center of the wing moves forward and that a maximum thickness near a tip of the wing moves aft, thereby contouring the wing to coincide more closely with the conical nature of the flow on the upper surface.

A nearly constant compressive loading characterizes the flow field over the lower surface of the wing. Magnitude of these compressive pressures on the lower surface depends on angle of attack and a streamwise curvature of the lower surface of the wing and not on a cross-sectional spanwise curvature. The present invention thereby shapes the lower surface to create an area as large as possible with negative slopes.

The present invention employs a scheme that redistributes an area from the lower surface to the upper surface of the wing at a given streamwise cross-section. The scheme optimizes a cross-sectional slope of the upper surface.

Any wing defined by a leading-edge sweep, a position of a maximum thickness, a distribution of an airfoil thickness and a leading-edge radius may be used to obtain the final, shaped geometry of the upper and lower surfaces of the present invention. Compared to a conventional constant airfoil swept wing, a natural flow wing has an increased forward-sloping projected area and more gradual slopes on the upper surface forward of the maximum thickness, reduced slopes on the upper surface aft of the maximum thickness, and a lower surface with negative slopes.

DESCRIPTION OF THE PREFERRED EMBODIMENT

Figure 1:
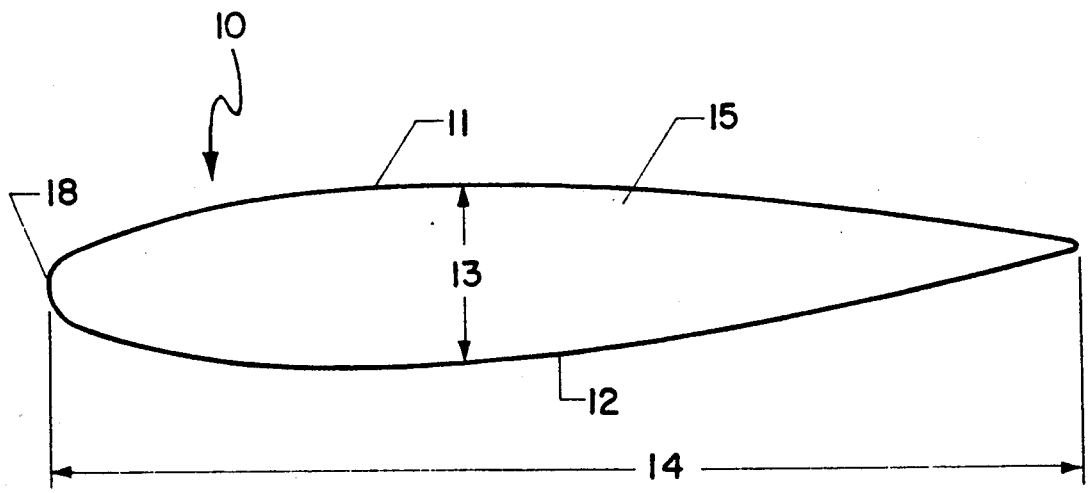
FIG. 1 illustrates a streamwise cut of a conventional, constant airfoil of a swept wing.

FIG. 1 illustrates a streamwise cut of a conventional, constant airfoil swept wing 10 with an upper surface 11, a lower surface 12, a leading edge 18, a maximum thickness 13, and a chord length 14. An airfoil shape 15 is constant along the span of the wing. The conventional, constant airfoil swept wing also has along the span a constant thickness ratio, defined as the maximum thickness 13 divided by the chord length 14, or the thickness ratio might decrease along the span.

Figure 2:
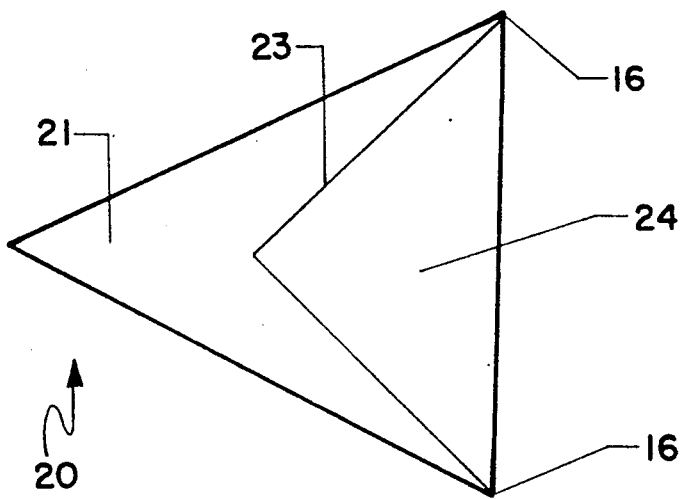
FIG. 2 is a planform view of the conventional swept delta wing.

As shown in FIG. 2, a line of maximum thickness 23 locates the maximum thickness 13 of each airfoil shape 15 along the span of the wing. Standard application of the thickness 13 to an uncambered swept delta wing 20 results in a wing which is conical about a wing tip 16 as depicted in FIG. 2. Area in front of maximum thickness line 23 has a forward-sloping surface 21 and area behind line 23 has a rearward-sloping surface 24.

Figure 3:
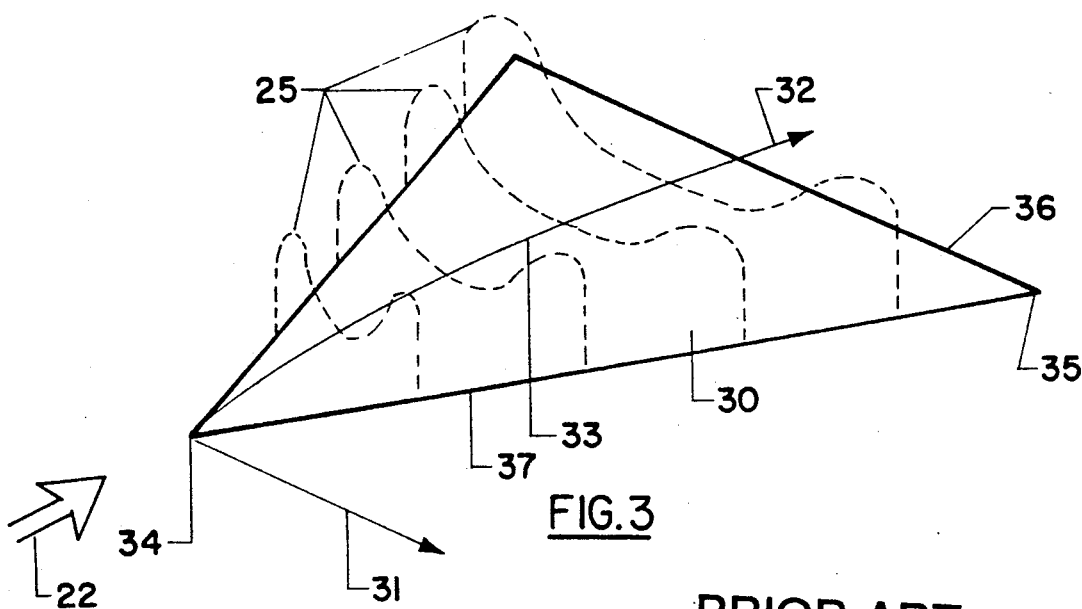
FIG. 3 is an orthogonal view of an upper surface of the delta wing showing a typical pressure distribution.

FIG. 3 shows an upper surface 30 of the swept delta wing 20. Results obtained for the delta wing 20 are readily transferable to other planforms due to the generic nature of the geometry of the delta wing 20. The upper surface 30 extends in a spanwise direction 31 from a root 33 to a wing tip 35 and in a streamwise direction 32 from an apex 34 to a trailing edge 36. A leading edge 37 extends from the apex 34 to the tip 35.

Experimental data and theoretical analysis show that for flow direction 22 a pressure loading 25 over the upper surface 30 of the swept delta wing 20 at subsonic, transonic, and supersonic speeds tends to be conical about the apex 34 and not conical about the tip 35. The conical nature of the pressure field 25 on the upper surface 30 of wing 20 produces favorable and unfavorable pressure fields based on considerations involving drag.

As demonstrated in FIG. 4, the pressure 25 over upper surface 30 for wing 20 at lifting conditions is characterized by an outboard region 41 of pressure below freestream static pressure and an inboard region 42 of more positive pressure. A line of recompression 43, which can be straight as shown or curvilinear, emanates from apex 34 and extends toward trailing edge 36. The line of recompression 43 is generally independent of wing geometry and marks a border between outboard region 41 and inboard region 42.

Figure 4:
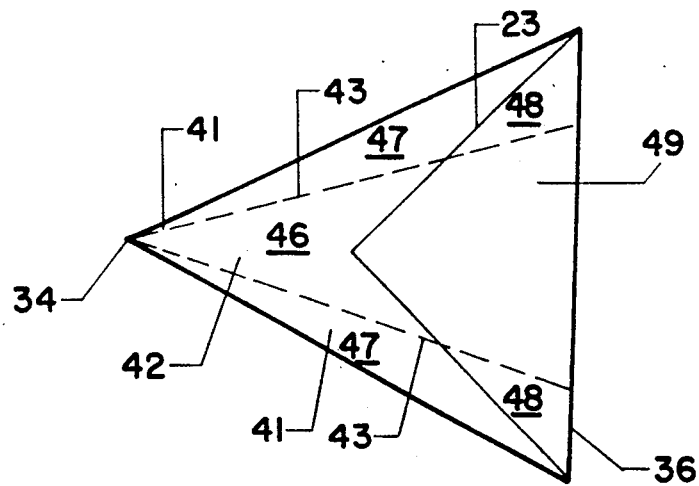
FIG. 4 is a planform view of the upper surface of the conventional swept wing showing a recompression line.

As shown in FIG. 4, maximum thickness line 23 and recompression line 43 intersect one another and divide upper surface 30 into four zones 46, 47, 48, and 49 that identify two favorable and two unfavorable zones of performance. The two unfavorable zones of performance are inboard forward zone 46 and outboard aft zone 48. Inboard forward zone 46 experiences a compression of flow ahead of the maximum thickness line 44, resulting in more positive pressures acting on the forward-facing surface 21 that produce high drag levels. Rearward-facing surface 24 combines with high negative pressure coefficients in outboard aft zone 48 to produce high drag levels. The two other zones 47 and 49 of upper surface 30 have pressure fields 25 which combine favorably with the local surface geometry to produce reductions in drag.

Figure 5:
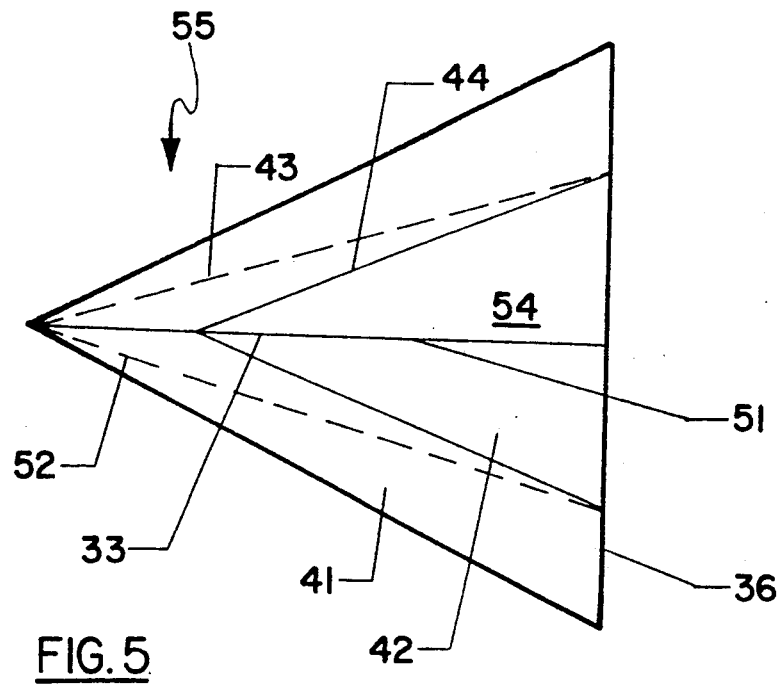
FIG. 5 is a planform view of the upper surface of a natural flow wing.

The present invention reduces or eliminates the unfavorable zones with high drag 46 and 48 by locating a first maximum thickness line 44 near the recompression line 43 as depicted in FIG. 5 for natural flow wing 55. By moving the maximum thickness line 44 forward at centerline 51 and sweeping line 44 aft to the trailing edge 36, a first forward-sloping surface 52 is minimized in inboard region 42 and maximized in outboard region 41. Further, a first rearward-sloping surface 54 is maximized in inboard region 42 and minimized in outboard region 41. The resulting shape of upper surface 30 has a small forward-sloping surface 52 ahead of line 44 and a large rearward-sloping surface 54 behind line 44 in the inboard region 42. Upper surface 30 also has, in outboard region 41, a large forward-sloping surface 52 and a small or no rearward-sloping surface 54 behind line 44. The shape of upper surface 30 thus coincides with the conical nature of the pressure field 25.

Figure 6:
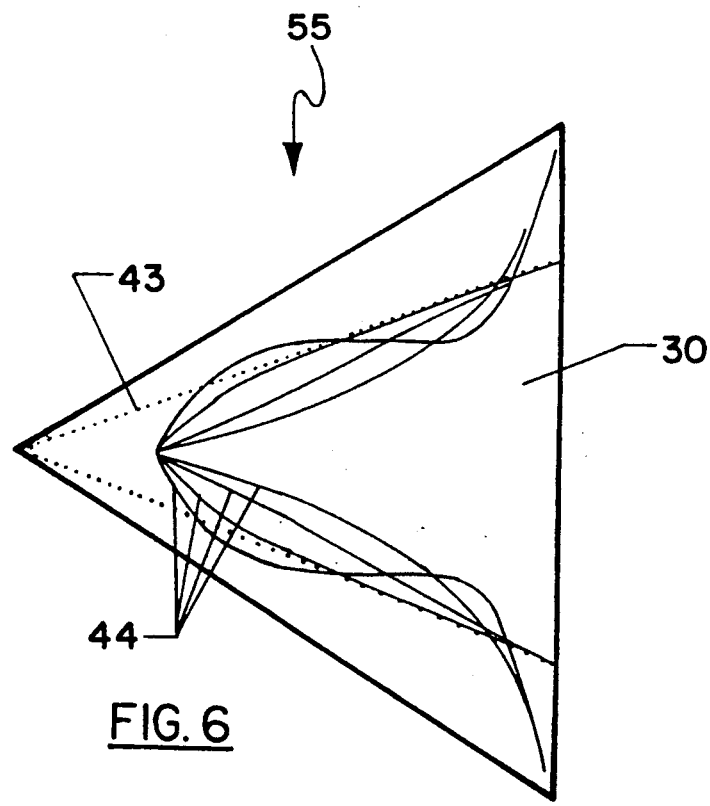
FIG. 6 illustrates alternative locations of a maximum thickness line for the upper surface of the natural flow wing.

FIG. 6 illustrates alternative locations of maximum thickness line 44 on upper surface 30 that would provide the favorable results of a natural flow wing 55. The alternatives shown in FIG. 6, however, are not exclusive. Preferably, the maximum thickness line 44 meets centerline 51 at a 20 percent chord length to provide a smooth airfoil at the root 33 as illustrated in FIG. 5.

Figure 7:
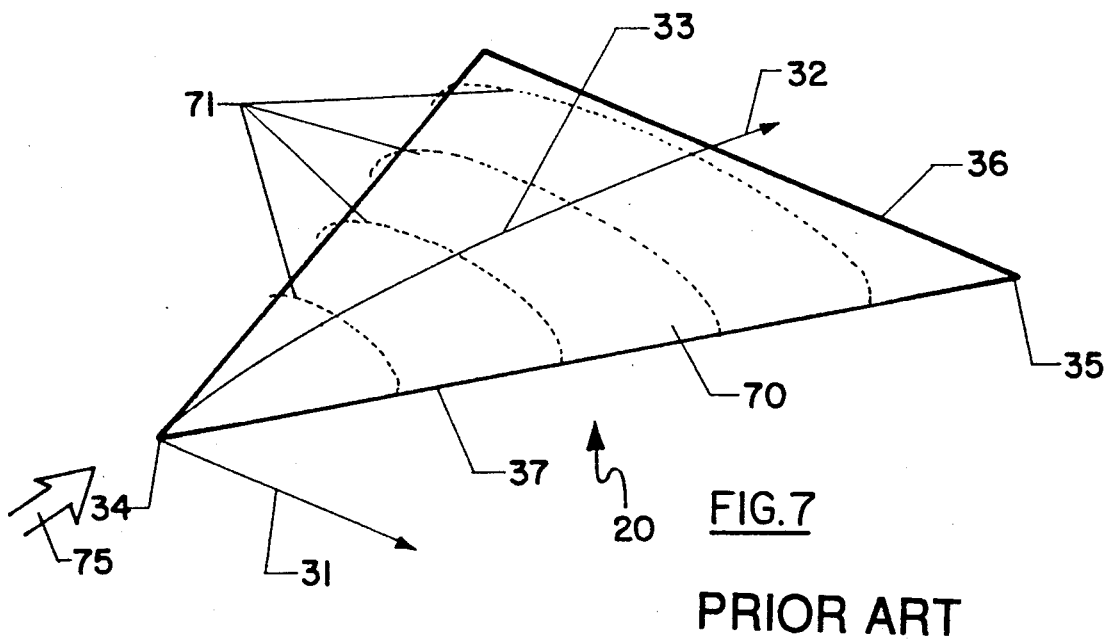
FIG. 7 is an orthogonal view of a lower surface of the delta wing showing a typical pressure distribution.

As appears in FIG. 7, a lower surface 70 of the swept delta wing 20 extends in the spanwise direction 31 from the root 33 to the wing tip 35 and in the streamwise direction 32 from the apex 34 to the trailing edge 36. The leading edge 37 extends from the apex 34 to the tip 37.

Flow 75 over the lower surface 70 of wing 20 behaves quite differently at positive angles of attack than the upper surface 30. Lower surface 70 thus requires a different type of geometry. FIG. 7 demonstrates that the flow 75 over lower surface 70 is characterized by a nearly constant compression loading 71. The magnitude of compressive pressure 71 primarily depends upon wing-surface streamwise curvature and not on spanwise cross-sectional curvature. The most beneficial lower surface 70 would thus have as large an area as possible with a rearward slope.

Figure 8:
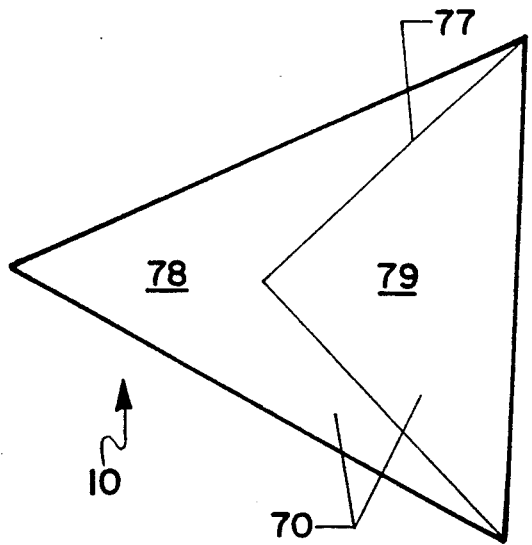
FIG. 8 is a planform view of the lower surface of the conventional swept wing.

Conventional wing 10 typically has a second line of maximum thickness 77 for lower surface 70 as illustrated in FIG. 8. Area in front maximum thickness line 77 has a second forward-sloping surface 78 and area behind line 77 has a second rearward-sloping surface 79.

Figure 9:
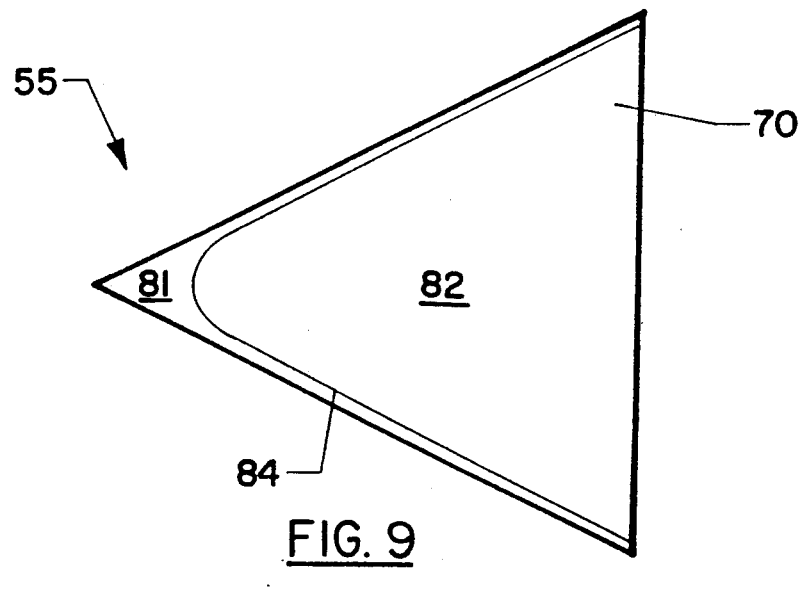
FIG. 9 is a planform view of the lower surface of the natural flow wing.

The present invention maximizes a second rearward-sloping surface 82 and consequently minimizes a second forward-sloping surface 81 by locating a second maximum thickness line 84 as demonstrated in FIG. 9 for natural flow wing 55. The resulting shape of lower surface 70 has a small forward-sloping surface 81 and a large rearward-sloping surface 82 as shown in FIG. 9.

Figure 10:
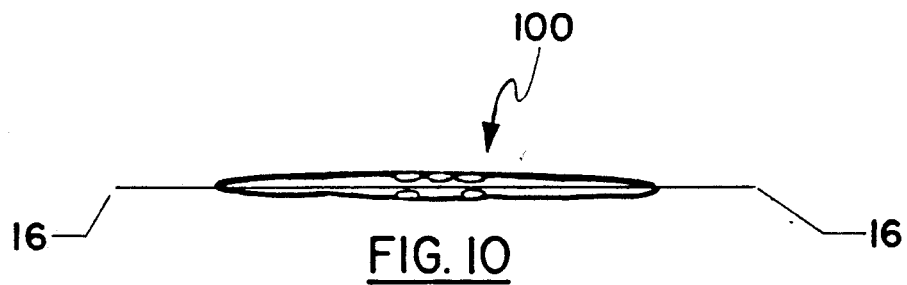
FIG. 10 shows spanwise cuts of the conventional swept wing.
Figure 11:
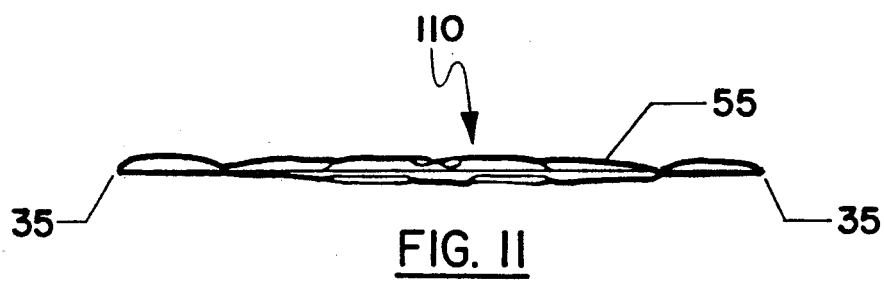
FIG. 11 shows spanwise cuts of the natural flow wing.

Additional modifications to the conventional wing 10 would further improve aerodynamic performance. Referring to FIG. 10, spanwise cuts 100 reveal that the thickness 13 of conventional wing 10 typically decreases in the spanwise direction 31 and that thickness 13 approaches zero at wing tip 16. Referring now to FIG. 5, maximum thickness line 44 meets centerline 51 at a 20 percent chord length to provide a smooth airfoil at the root 33. This location of line 44 is not ideal because the more positive pressures of inboard region 41 are acting on forward-sloping surface 52 and thereby producing high drag levels. To compensate for this drawback while retaining a smooth airfoil at the root 33, the present invention decreases maximum thickness 13 at root 33 and increases thickness 13 at the tip 35, with an example of one possible final shape of natural flow wing 55 depicted with spanwise cuts 110 in FIG. 11.

Figure 12:
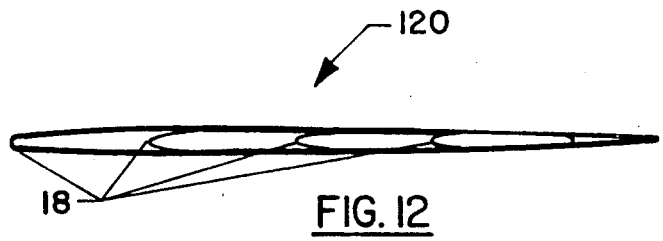
FIG. 12 illustrates streamwise cuts of the conventional swept wing.
Figure 13:
FIG. 13 illustrates streamwise cuts of the natural flow wing.

Referring to FIG. 12, streamwise cuts 120 of the conventional wing 10 illustrate that leading edge 18 has a constant bluntness as the wing extends in spanwise direction 31. The present invention preferably contours upper surface 30 and lower surface 70 to form leading edge 37, as shown in FIG. 13, with increasing bluntness in the inboard-to-outboard spanwise direction. The combination of increasing the thickness ratio and leading-edge bluntness from the root 33 to the wing tip 35 provides a more constant wing thickness 13 from the root 33 to the tip 35. Thus, lower drag levels are achieved because the nearly constant low pressure at the leading edge 37 has a better surface geometry to act upon.

Figure 14:
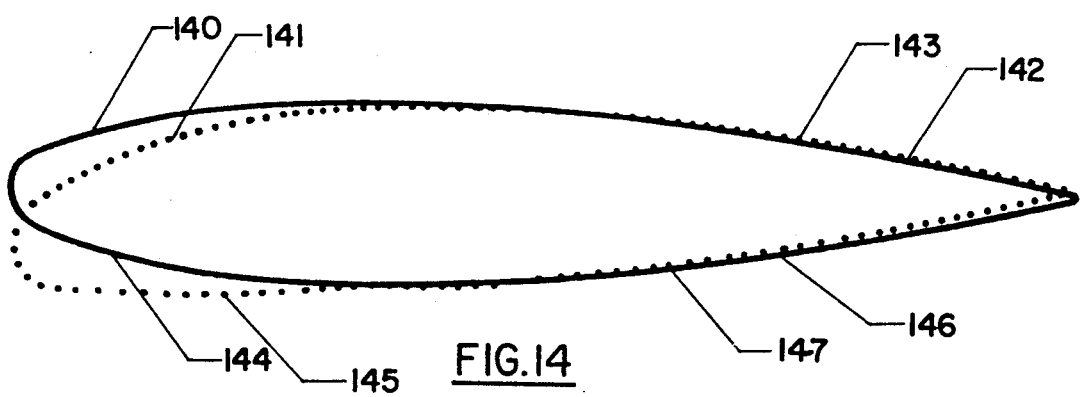
FIG. 14 is a comparison between a streamwise section of the conventional wing and the natural flow wing.

Referring to FIG. 14, the forward-sloping surface of upper surface 11 of conventional wing 10 has a forward slope 140 and the rearward-sloping surface has a rearward slope 142. A steeper forward slope provides greater frontal area as discussed above. The present invention preferably changes the conventional, constant airfoil wing 10 such that upper surface 30 of natural flow wing 55 has a majority of forward-facing slopes 141 steeper than forward slope 140 and a majority of rearward-facing slopes 143 less steep than rearward slope 142, as shown in FIG. 14.

FIG. 14 also demonstrates that the forward-sloping surface of lower surface 12 of the conventional wing 10 has a forward slope 144 and the rearward slope of 146. The present invention preferably contours lower surface 70 of natural flow wing 55 such that a majority of forward-facing slopes 145 are less steep than forward slope 144 and a majority of rearward-facing slopes 147 are steeper than rearward slope 146, as illustrated in FIG. 14. Frontal area should be minimized on the lower surface because no region of low pressure (expansion) exists.

Figure 15:
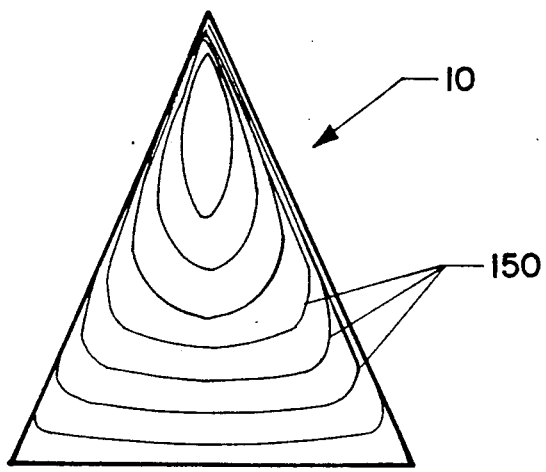
FIG. 15 shows elevation cuts of the conventional wing.
Figure 16:
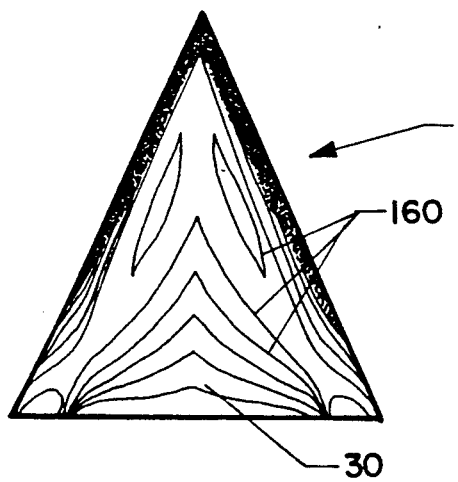
FIG. 16 shows elevation cuts of the upper surface of the natural flow wing.
Figure 17:
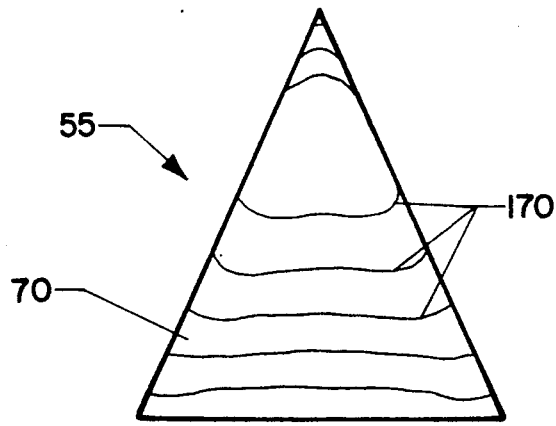
FIG. 17 illustrates elevation cuts of the lower surface of the natural flow wing.
Figure 18A:
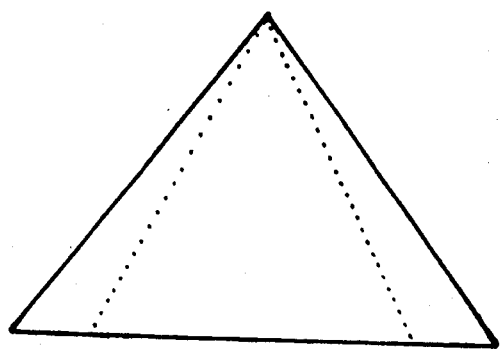
FIGS. 18(a), 18(b), 18(c) and 18(d) illustrate possible wing planform shapes that may be used to obtain the natural flow wing.
Figure 18B:
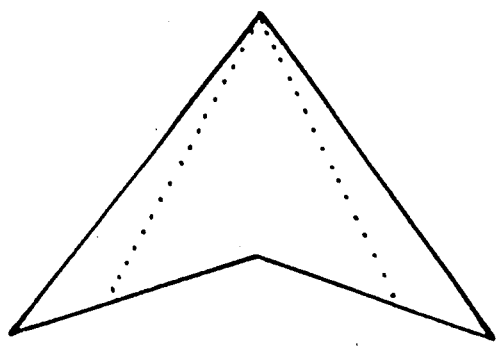
Figure 18C:
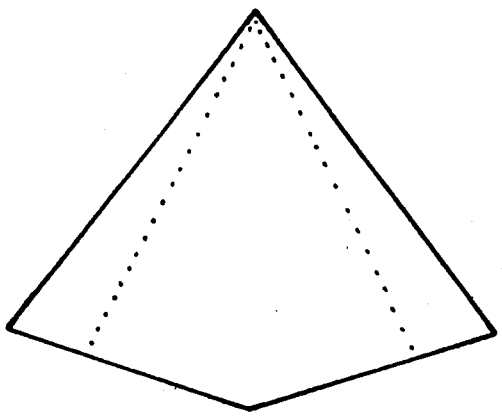
Figure 18D:
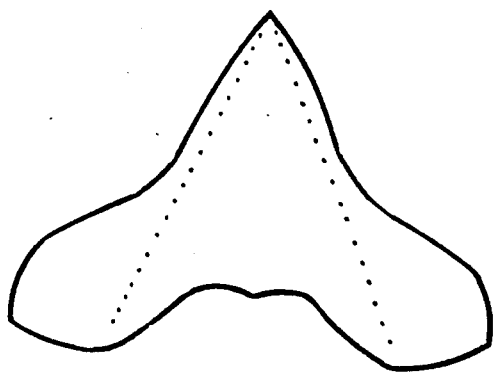

Elevation cuts 150 of the conventional wing 10, which are identical for both the upper surface and lower surface, appear in FIG. 15. FIGS. 16 and 17 illustrate preferred elevation cuts 160 and 170 for natural flow wing 55. Note that elevation cuts 160 for upper surface 30 differ in pattern from elevation cuts 170 for lower surface 70.

A wing geometry generation scheme would allow for a broad range of analytical wing surfaces to be developed from a few input parameters. Any wing defined by a leading-edge sweep, a position of maximum thickness, a distribution of an airfoil thickness, and a leading-edge radius may be used to obtain the final, shaped geometry of upper surface and lower surface 70 of natural flow wing 55. Distribution of the airfoil thickness and maximum thickness position may be defined by the equation:

$$\phi_t = \sum_{n=0}^{\infty} a_n \eta^n + \sum_{n=1}^{\infty} \frac{b_n}{\eta^n},$$

where $a_n$ and $b_n$ are variables which can be series themselves and $\eta$ is the nondimensionalized spanwise location. For the conventional wing 10, a constant airfoil 15 is employed which has a variation in airfoil thickness and airfoil thickness position defined by all $a_n$ and $b_n$ equal to zero for $n > 0$. Examples of possible wing shapes which may be defined by the above equation are demonstrated in FIGS. 18(a), 18(b), 18(c) and 18(d). Preferably, a wing with a positive leading edge sweep greater than 20° and a trailing edge sweep of any value may be used to obtain the final, shaped geometry of natural flow wing 55.

The present invention also employs a scheme that redistributes an area from lower surface 70 to upper surface 30 at a given streamwise cross-section in order to optimize local cross-sectional slopes of upper surface 30. The scheme to redistribute the area is defined by the equation:

$$\phi_c = \sum_{n=0}^{\infty} a_n \xi^n + \sum_{n=1}^{\infty} \frac{b_n}{\xi^n}$$

where $a_n$ and $b_n$ are variables as discussed above and $\xi$ is the nondimensionalized streamwise location.

What is claimed is:

1. A natural flow wing for providing improved drag and lift performance comprising:
   an upper surface and a lower surface, each surface extending in a streamwise and in a spanwise direction and being three-dimensional;
   the upper surface having an outboard region of pressure below freestream static pressure and an inboard region of pressure higher than the outboard region, with a line of recompression emanating from an apex of the wing and extending toward a trailing edge, the line of recompression marking a boarder between the outboard region and the inboard region;
   the upper surface further having a first line of maximum thickness extending from a root of the wing to the trailing edge, the first line of maximum thickness marking a border between a first forward-sloping surface, the first line of maximum thickness being located near the line of recompression;
   the inboard region providing a small first forward-sloping surface area ahead of the first line of maximum thickness and a large first rearward-sloping surface area behind the first line of maximum thickness;

the outboard region providing a large first forward-sloping surface area ahead of the first line of maximum thickness and a small first rearward-sloping surface behind the first line of maximum thickness;

the lower surface having a second line of maximum thickness extending from the root of the wing toward the trailing edge; and the lower surface further providing a small second forward-sloping surface area ahead of the second line of maximum thickness and a larger second rearward-sloping surface behind the second line of maximum thickness.

2. A natural flow wing according to claim 1, wherein the inboard region of the upper surface provides a first forward-sloping surface area ahead of the first line of maximum thickness comprising no more than about 5% of the inboard region and a first rearward-sloping surface area behind the first line of maximum thickness comprising the remainder of the inboard region:

the outboard region of the upper surface provides a first forward-sloping surface area ahead of the first line of maximum thickness comprising at least about 95% of the outboard region and a first rearward-sloping surface area behind the first line of maximum thickness comprising the remainder of the outboard region; and the lower surface provides a second forward-sloping surface area ahead of the second line of maximum thickness comprising no more than about 5% of the lower surface and a second rearward-sloping surface behind the second line of maximum thickness comprising the remainder of the lower surface 3. A natural flow wing according to claim 2, wherein the upper surface and the lower surface combine to form a thickness which does not approach zero at wing tip.

4. Natural flow wing according to claim 2, wherein the upper surface and the lower surface combine to form a leading edge, the leading edge having an increasing bluntness to chord ratio in the inboard-to-outboard spanwise direction.

5. A natural flow wing according to claim 2, wherein at least about 95% of the wing thickness is projected as forward slope on the upper surface ahead of the first line of maximum thickness.

6. A natural flow wing according to claim 2, wherein no more than about 20% of the wing thickness is projected as rearward slope on the upper surface behind the first line of maximum thickness.

7. A natural flow wing according to claim 2, wherein no more than about 5% of the wing thickness is projected as forward slope on the lower surface ahead of the second line of maximum thickness.

8. A natural flow wing according to claim 2, wherein at least about 80% of the wing thickness is projected as rearward slope on the lower surface behind the second line of maximum thickness.

9. A method of constructing a natural flow wing for providing improved drag and lift performance comprising:

shaping an upper surface of the natural flow wing such that (a) the upper surface has an outboard region of pressure below freestream static pressure and an inboard region of pressure higher than the outboard region;

(b) a small first forward-sloping surface area is formed in the inboard region and a large first forward-sloping surface area is formed in the outboard region;

(c) a large first rearward-sloping surface area is formed in the inboard region and a small first rearward-sloping surface area is formed in the outboard region; and shaping a lower surface of the natural flow wing such that (a) a small second forward-sloping surface area and a large second rearward-sloping surface are formed.

10. A method according to claim 9, further comprising:

shaping an upper surface of the natural flow wing such that (a) the first forward-sloping surface area in the inboard region comprises no more than about 5% of the inboard region and the first rearward-sloping surface area comprises the remainder of the inboard region;

(b) the first forward-sloping surface area in the outboard region comprises at least about 95% of the outboard region and the first rearward-sloping surface area comprises the remainder of the outboard region; and shaping a lower surface of the natural flow wing such that (a) the second forward-sloping surface area of the lower surface comprises no more than about 5% of the lower surface and the second rearward-sloping surface area comprises the remainder of the lower surface.

11. A method according to claim 10, further comprising:

minimizing a thickness taper in a spanwise direction, such that thickness of the natural flow wing does not approach zero at wing tip.

12. A method according to claim 10, further comprising:

shaping a leading edge of the natural flow wing to form an increasing bluntness to chord ratio of a leading edge in an inboard-to-outboard spanwise direction.

13. A method according to claim 10, wherein the method of shaping the upper surface of the natural flow wing further comprises making at least about 95% of the wing thickness forward-facing slopes.

14. A method according to claim 10, wherein the method of shaping the upper surface of the natural flow wing further comprises making no more than about 20% of the wing thickness rearward-facing slopes.

15. A method according to claim 10, wherein the method of shaping the lower surface of the natural flow wing further comprises making no more than about 5% of the wing thickness forward-facing slopes.

16. A method according to claim 10, wherein the method of shaping the lower surface of the natural flow wing further comprises making at least about 80% of the wing thickness rearward-facing slopes.

17. A natural flow wing according to claim 2, wherein the upper surface and the lower surface combine to form a wing shape with a positive leading edge sweep greater than 20° and a trailing edge sweep of any value.

* * * * *